United States Patent [19]
Jahrsetz et al.

[11] Patent Number: 5,736,793
[45] Date of Patent: Apr. 7, 1998

[54] CONTROL SYSTEM FOR ELECTRICAL COMPONENTS OF A MOTOR VEHICLE

[75] Inventors: Achim Jahrsetz, Velbert; Frank Kleefeldt, Heiligenhaus; Wilfried Ostermann, Essen; Fred Welskopf, Herne, all of Germany

[73] Assignee: Kiekert AG, Heiligenhaus, Germany

[21] Appl. No.: 661,485

[22] Filed: Jun. 11, 1996

[30] Foreign Application Priority Data

Aug. 18, 1995 [DE] Germany .................. 195 30 721.6

[51] Int. Cl.$^6$ ............................................. B20R 25/00
[52] U.S. Cl. ................... 307/10.1; 180/287; 307/66; 340/825.72
[58] Field of Search ........................ 307/9.1–10.6, 307/18, 23, 43, 64, 66; 364/423.098, 424.045, 423.099; 180/287; 70/264, 256, 237; 340/425.5, 426, 825.3–825.32, 825.34, 825.69, 825.72

[56] References Cited

U.S. PATENT DOCUMENTS

| | | | |
|---|---|---|---|
| 5,521,443 | 5/1996 | Imura et al. | 307/10.2 |
| 5,547,208 | 8/1996 | Chappell et al. | 307/10.1 |
| 5,552,641 | 9/1996 | Fischer et al. | 307/10.5 |
| 5,552,642 | 9/1996 | Dougherty et al. | 307/10.3 |

FOREIGN PATENT DOCUMENTS

| | | |
|---|---|---|
| 42 27 887 | 1/1994 | Germany . |
| 42 38 858 | 2/1994 | Germany . |
| 44 28 947 | 4/1996 | Germany . |

*Primary Examiner*—Richard T. Elms
*Attorney, Agent, or Firm*—Herbert Dubno

[57] ABSTRACT

A control system for electrical components of a motor vehicle has an emergency battery and emergency circuitry which, when the starter battery fails, connects the control unit to the emergency battery and cuts off comfort functions like window lifters while allowing the basic control mode to operate in which door locks, a theft alarm and a lid lock for the compartment containing the starter battery remain operative.

8 Claims, 1 Drawing Sheet

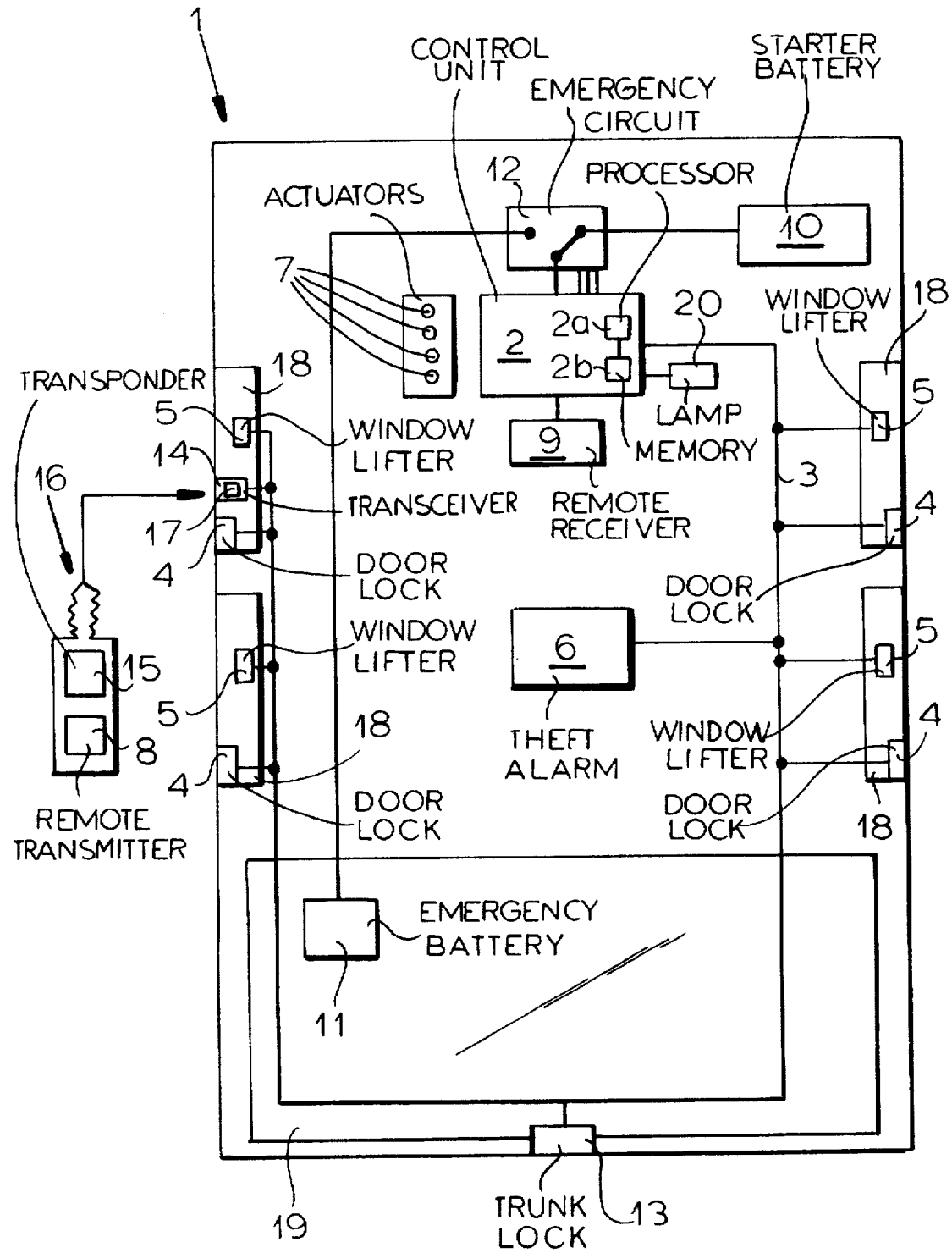

CONTROL SYSTEM FOR ELECTRICAL COMPONENTS OF A MOTOR VEHICLE

FIELD OF THE INVENTION

Our present invention relates to a control system for electrical components of a motor vehicle, and, more particularly, to a control system for electrical components such as door locks and comfort components such as window lifters, normally operated from the standard vehicle electrical system including the starter battery of the vehicle, but provided according to the invention with an emergency battery and emergency circuitry.

BACKGROUND OF THE INVENTION

A motor vehicle such as a passenger car, can be provided with a control system for operating electrical components of the vehicle either centrally or by a remote control unit from outside the vehicle or by actuators from within the vehicle which may be distributed or localized at the central control unit. Any combination of such actuation may also be used.

Electrically-controllable or operable vehicle components include vehicle locks, window lifters and a theft alarm or warning system. The vehicle can be provided with electrical actuating elements and/or a remote control device comprised of a remote transmitter and a receiver for the wirelessly-transmitted signals from the remote transmitter, which operate the electrical components through the control unit and for which a starter battery is connected to the control system to supply the control unit and the electrically-operated components with electrical energy.

An electrical control system of this type can operate, for example, apart from the vehicle locks, especially the vehicle door locks, also such vehicle components as interior lighting, the windows mentioned previously, sliding sunroofs, vehicle seats, hood locks, glove compartment closures, trunk locks, fuel tank cover locks and, as also previously noted, the alarm system for alerting of a possible incursion or attempt to disturb the vehicle, i.e. the theft alarm.

Those components which primarily function mechanically will usually be provided with electrically-operated or electrically-controlled effectors, i.e. electrically-operated devices for displacing the mechanical elements. Such effectors can include solenoids, electric motors or similarly functioning elements capable of positioning or displacing the mechanical elements to which they are connected.

The electrical control can be effected by transmission of control signals from the control unit through a signal-conductor means which can include at least one control line. For example, and in a preferred mode, control signals are transmitted over a multiplex single-conductor bus to the electrically-operated components.

When a digital system is used, the single-conductor bus can transmit trains of digital signals and the control unit and the component connected to the bus can be provided with respective processors.

For the electrically-operated components, therefore, in addition to such a single-conductor bus, only a current supply line may be necessary for supplying the vehicle component with electrical energy. The opposite pole can be formed by the common ground constituted by the metal body or chassis of the vehicle.

When a multiplex single-conductor bus is used, the control unit as a rule will have a central processor and each of the components or groups of components will have a respective satellite processor, these processors effecting the multiplex function in addition to differentiating the transmitted signals for selective operation of the components.

It will also be understood that the control line or lines can also transmit sensor signals from sensors which may be provided in the components, for example, switches serving as position sensors. The control line can thus be a bidirectional bus.

The control system can thus include the electrically-operable vehicle components which normally are provided to operate, afford access to and control the vehicle as well as those components provided for comfort purposes like window lifters and glove compartment closures and interior lighting. It also may include, however, control components which are also connected to the central unit or the bus and are provided specifically for the control system. For example, a wireless remote control can be provided for the control system and usually will communicate therewith by means of radio waves (HF) or infrared light rays (IR).

In this case, in the remote control transmitter, control signals, which can be optionally coded, can be generated when a pushbutton is actuated and emitted by means of the transmitter. Control signals are picked up by the remote control receiver connected to the central control unit and emitted from the transmitter and these picked up signals can be supplied to the control system, usually also in coded form.

Attention may be directed to DE 42 27 887 C1 and DE 42 38 858 C1 for descriptions of such systems.

A starter battery serves not only for starting the motor vehicle engine but also to supply other consumers of electrical energy of the vehicle when the engine is off. Of course it will be understood that the consumers of electrical energy including the control system are supplied not only by the starter battery when the engine is running, but from any generator or alternator which can be driven by the engine.

With a system of the aforedescribed type, a starter battery failure can pose a significant problem. For example, the doors may not open and thus the interior of the vehicle may not be accessible. The same can apply to the hood through which the starter battery may be accessed. For this reason it has been proposed with conventional control systems to provide at least one vehicle door lock with a purely mechanical emergency lock-operating cylinder which can be key-operated and can unlock the door.

This solution is problematical on several grounds. For example, an emergency lock operating system which is purely mechanical in nature of necessity must be complex and expensive and may, therefore, be functionally unreliable, especially if it is to be mounted to a standard electrically-operated vehicle door lock. In addition, a purely mechanical operating system can be a weak point in the antitheft protection of the vehicle, especially if the electrical operating system has an antitheft mode which shuts down the ability to unlock the vehicle doors and thus restricts attempts by unauthorized individuals to access the interior of the vehicle. Mechanical devices, for example, are comparatively simple to bypass for unauthorized individuals.

There are known vehicle door locks which can be operated from outside the vehicle only by means of electrical actuating elements for unlocking purposes but these systems also have the disadvantage that, upon failure of the starter battery, they are no longer actuatable even from outside the vehicle by an authorized person.

OBJECTS OF THE INVENTION

It is, therefore, the principal object of the present invention to provide an improved control system for electrically-operated components of a motor vehicle whereby the aforedescribed drawbacks can be obviated.

Another object of this invention is to provide an improved control system for a motor vehicle which remains functional even upon failure of the starter battery.

It is also an object of the invention to provide a system for the purposes described which need not depend on unreliable emergency lock cylinders functioning purely mechanically in the event of a starter battery failure.

Yet a further object of the invention is to provide an improved electrical control system for an automotive vehicle which is particularly reliable, of comparatively low cost and free from disadvantages enumerated above and otherwise characterizing previous central electrical control systems.

SUMMARY OF THE INVENTION

These objects and others which will become apparent hereinafter are attained, in accordance with the invention, by providing an emergency battery in addition to an emergency circuitry which, upon the development of an "undervoltage" in the control system from the starter battery, i.e. a starter battery voltage which falls below a certain value, will separate the battery from the control system and connect the emergency battery thereto while simultaneously deactivating comfort control functions of the control unit while activating a basic control mode thereof.

The emergency battery can be dimensioned and configured to supply those electrically-controllable vehicle components with electrical energy in the case of a discharged starter battery, which are most essential for access to the vehicle, etc. The emergency battery is preferably received in the interior, for example, the passenger compartment of the vehicle or in the trunk thereof and can be significantly weaker than the starter battery with respect to its ampere-hour capacity although it may be rechargeable from the alternator or generator.

The emergency circuitry can include a circuit capable of measuring the voltage of the starter battery and can be a separate circuit from that of the control unit or can be the processor of the control unit itself controlled by an appropriate program which enables a fall in the voltage of the starter battery to be detected and the cut off of the starter battery and the activation of the system by the emergency battery controlled by the program.

The "undervoltage" refers to a lower limit of the voltage of the starter battery below which the control functions of the control system cannot reliably be carried out. In the case of a system which normally operates at 12 volts with the starter battery at full capacity and charge, a suitable lower limit for the starter battery at which the starter battery should be cut out and the emergency battery cut in, is 11.4 volts.

The basic control mode of the invention is control of the vehicle door locks or at least one vehicle door lock. The activation of the basic control mode, therefore, means that at least one door lock can be electrically unlocked and locked. The basic control mode should also include electrical operation of the antitheft functions of the door locks and deactivation thereof as well as the electrical operation of the theft alarm, i.e. activation and deactivation thereof. All other functions of the electrical control system can be considered the comfort functions. To the extent that the starter battery is only accessible through an electrically-operable closure, for example a lock for a hood or trunk, the operation of this lock will also be considered part of the basic control mode.

The comfort control functions, therefore, can be all control functions other than those required for access to the vehicle and to the starter battery and for operation of the alarm. These can include control of the window lifters, control of the sun roof, especially control of interior lighting or the radio, and the like. Of course the emergency system of the invention is brought into play not only upon a discharge of the starter battery but also an electrical separation of the starter battery from the vehicle (i.e. theft of the starter battery). In this case, the voltage measurement circuit would register a starter battery voltage of zero volt.

The system of the invention has a variety of advantages. For example, a purely mechanical emergency unlocking system or cylinder need not be provided and thus the security of the vehicle need not be comprised by a purely mechanical system. Nevertheless reliable access to the vehicle is afforded even in the case of a discharged starter battery and the antitheft security need not be compromised either. By the differentiation between the comfort control functions and the basic control mode, we can ensure that the emergency battery can be dimensioned so as to be comparatively small and nevertheless can enable access to the vehicle for a period of time sufficient to enable the starter battery to be recharged or a starter battery to be reconnected. The differentiation can also ensure that the comfort functions, for example, interior lighting or radio, which may have contributed to the discharge of the starter battery, will not rapidly discharge the emergency battery.

According to a feature of the invention, the basic control mode can also be activated through the emergency circuitry also by the remote transmitter which is used for remote control of the system. Of course, the remote control receiver may also be deactivated by an "undervoltage" in the manner which has been described and for that purpose, the emergency control circuitry can have a transponder interrogation receiver accessible from outside the vehicle and which is activatable by a transponder whereby the transponder interrogation transceiver and the transponder each may be equipped with a code word memory containing a stored code word. Upon activation by the transponder interrogation receiver, the stored code word in the transponder can be read and compared with the stored code word of the transceiver, the basic control mode being activated based upon the comparison of the transceiver-queried code word with the transceiver stored code word.

The activation of the transponder interrogation transceiver can be effected in various ways. In one case, the transponder can have a classic key with which a key-operated switch with a locking cylinder can be actuated. In another case, an insertion shaft can be provided for the transponder in which a switch is provided and which is actuated by insertion of the transponder. The transponder can be part of the remote control unit or transmitter for the system.

The code word can be a fixed code word but preferably is a changeable code word. Reference may be made to copending application Ser. No 08/457,730 filed 18 Aug. 1995 (now U.S. Pat. No. 5,561,420 issued 10 Oct. 1996).

The features described here are suitable not only for emergency actuation of the system in the case of a field remote control unit but also and preferably for operation of the system in the case of a failure of the starter battery. To that extent the system has a double-protection against failure.

BRIEF DESCRIPTION OF THE DRAWING

The above and other objects, features, and advantages will become more readily apparent from the following description, reference being made to the accompanying drawing the sole FIGURE of which is a diagram showing a vehicle provided with an electrical control system in accordance with the present invention.

SPECIFIC DESCRIPTION

In the drawing, we have shown an automotive vehicle 1, such as a passenger car, provided with a control system having a central control unit 2 which can be equipped with a microprocessor 2a and a memory 2b, the latter storing a code word if desired while the former may be programmed for the various operations both of the comfort functions and for the basic control mode. These will be described in greater detail hereinafter.

The control unit 2 is connected by a multiplex single-conductor bus 3 to a multiplicity of electrically-operated components of the vehicle such as the vehicle locks 4, 13, window lifters 5 and theft alarm 6. Each of these components may be equipped with a processor as well to respond to signals transmitted along the bus from the control unit 2 and each of the components may be provided with a position sensor for transmitting position signals to the central unit along the bus or for control of the respective processor.

The electrically-operated component can be actuated by operation of actuating element 7 connected to the control unit 2 and located within the vehicle 1. These actuating elements can be switches or buttons. Alternatively or in addition, a remote actuating device can be provided in the form of a remote transmitter 8 which can activate the receiver 9 for the remote control unit 8 and which is connected to the control unit 2.

The system is connected to a starter battery 10 which supplies electrical energy to the control unit 2 and to all of the components operated thereby. Apart from the starter battery 10, the system is equipped with an emergency battery 11. According to the invention an emergency circuit 12 is provided for the control unit 2 which includes a measuring circuit for measuring the voltage across the starter battery 10 and which is thus responsive to a certain "undervoltage" delivered by the starter battery 10 to separate the latter from the control unit 10 and connect the emergency battery 11 to supply the latter.

Simultaneously, comfort control functions of the control unit 2 are deactivated while a basic control mode is activated. In the embodiment illustrated, the basic control mode encompasses operation of all vehicle door locks 4, the theft alarm 6 and, where appropriate, the trunk lock 13 to the extent that the starter battery 10 may be located in the trunk or the hood lock in the case that the starter battery is located in the engine compartment.

Since the vehicle door locks 4 are electrically releasable by electrical effectors and can be set into an antitheft securing state by the operation of a further effector, the activation of the basic control functions will be understood to require operation of both of these effectors.

The control system can comprise a transponder interrogation transceiver 14 which can be effective exteriorly of the vehicle or rather is accessible from the exterior of the vehicle and can be mechanically actuated by means of a transponder 15. The transponder interrogation transceiver 14 and the transponder 15 can each be equipped with code word memories in which code words can be stored. Upon activation of the transceiver 14, e.g. by insertion of the key 16 of the transponder 15 therein, the transceiver 14 can interrogate the transponder to derive the stored code word therefrom and compare it with the code word stored in the transceiver.

Upon a match of the two code words, showing that the transponder is authorized, the basic control mode is activated.

Upon a failure of the starter battery 10, which is immediately detected by the emergency circuit 12, there is a switchover of the control system from the starter battery 10 to the emergency battery 11. The emergency circuitry 12 then deactivates the comfort control function of the control unit 2, for example, cuts out the window lifters 5. The number of electrically-operable components is thereby reduced to a minimum. If the vehicle door is to be opened, the user can insert the key 16 of the transponder 15 into the lock cylinder 17 and rotate the latter in the clockwise sense until the key stops. Since the cylinder 17 is a key-operated switch, the transponder interrogation transceiver 14 is activated and reads the code word from the transponder 15. In the transceiver 14, this code word is stored with the code word of the receiver and, upon a match or identical, the theft alarm 6 is deactivated. The door locks 4 are brought out of their antitheft positions and an electrical operation of the door locks 4 is permitted. The activation of the external command for the door locks 4 means that the door locks are switched into positions in which an engagement with the door grip will open the door.

Since the starter battery 10 can be located in the trunk compartment, the external operation of the trunk closure 13 can be activated as well to allow access to the battery for recharging. The user or the service person can operate the doors 18 and the trunk lid 19. The closures 4, 13 are opened by electric motors.

It will be understood that an open vehicle lock 4, 13 can be closed by hand and an insertion of the key 16 in the lock cylinder and a rotation thereof to the left can permit the external actuation to be again deactivated and the vehicle locked. The control system advantageously has a monitoring element such as a lamp 20 which illuminates to indicate the deactivation of the comfort functions and thus a failure of the starter battery 10. Note that an alarm unit 6 in the case of an "undervoltage" at the starter battery is switched to the emergency battery as well.

We claim:

1. A door-lock and control system for an automotive vehicle, said system comprising:
    a multiplicity of electrically operated components on said automotive vehicle including a plurality of vehicle door locks, a plurality of window lifters and a theft alarm;
    a central control unit on said vehicle for selectively operating said components and including at least one operator-actuatable element, said control unit additionally activating comfort functions for said automotive vehicle;
    signal-conductor means including at least one control line connecting said central control unit with said components for operating said components in response to operation of said at least one operator-actuatable element;
    a starter battery serving at least to start the vehicle and connected to said control unit and said components for normally supplying electrical energy thereto;
    an emergency battery on said vehicle having at least sufficient capacity to operate said system and at least certain of said components upon disconnection of said starter battery from the system; and
    an emergency circuit including means for measuring voltage of said starter battery and responsive to a voltage across said starter battery below a predetermined level for automatically disconnecting said starter battery from the system, for connecting said emergency battery to operate said control unit and certain of said components in a basic control mode, and for deactivating said comfort functions to afford reliable access to said vehicle with said door locks until the starter battery is recharged and reconnected for a substantial period of time.

2. The door-lock and control system defined in claim 1 wherein only said door locks and said theft alarm are operated by said control unit in said basic control mode.

3. The door-lock and control system defined in claim 2, further comprising a transponder-interrogation transceiver activatable by a transponder external of said vehicle.

4. The door-lock and control system defined in claim 3 wherein said transceiver and said transponder each have a code-word memory with code words stored therein, upon activation of the transceiver the code word stored in said transponder is read out and compared with the code word stored in the transponder, and upon a matching of the code word read out of said transponder and the code word stored in the transceiver said basic control mode is activated.

5. The door-lock and control system defined in claim 1, further comprising a remote controller for said system in wireless communication with said control unit for activating said basic control mode.

6. The door-lock and control system defined in claim 5 wherein only said door locks and said theft alarm are operated by said control unit in said basic control mode.

7. The door-lock and control system defined in claim 1, further comprising a transponder-interrogation transceiver activatable by a transponder external of said vehicle.

8. The door-lock and control system defined in claim 7 wherein said transceiver and said transponder each have a code-word memory with code words stored therein, upon activation of the transceiver the code word stored in said transponder is read out and compared with the code word stored in the transponder, and upon a matching of the code word read out of said transponder and the code word stored in the transceiver said basic control mode activated.

\* \* \* \* \*